(12) United States Patent
Taneike et al.

(10) Patent No.: US 11,155,910 B2
(45) Date of Patent: Oct. 26, 2021

(54) HIGH-STRENGTH, HEAT-RESISTANT NI-BASE ALLOY, METHOD FOR PRODUCING SAME, AND GAS TURBINE BLADE

(71) Applicant: Mitsubishi Hitachi Power Systems, Ltd., Kanagawa (JP)

(72) Inventors: Masaki Taneike, Tokyo (JP); Ikuo Okada, Tokyo (JP); Kazumasa Takata, Yokohama (JP); Junichiro Masada, Yokohama (JP); Keizo Tsukagoshi, Yokohama (JP); Hiroyuki Yamazaki, Sendai (JP); Yoshiaki Nishimura, Sendai (JP); Shinya Ishikawa, Niigata (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 16/692,181

(22) Filed: Nov. 22, 2019

(65) Prior Publication Data

US 2020/0087768 A1 Mar. 19, 2020

Related U.S. Application Data

(62) Division of application No. 15/737,515, filed as application No. PCT/JP2016/069868 on Jul. 5, 2016, now abandoned.

(30) Foreign Application Priority Data

Jul. 9, 2015 (JP) .................................. 2015-137586

(51) Int. Cl.
| | | |
|---|---|---|
| *C22F 1/10* | (2006.01) | |
| *F01D 5/28* | (2006.01) | |
| *F01D 25/00* | (2006.01) | |
| *F02C 7/00* | (2006.01) | |
| *C22C 19/05* | (2006.01) | |
| *C22C 1/02* | (2006.01) | |
| *C22F 1/00* | (2006.01) | |

(52) U.S. Cl.
CPC .................. *C22F 1/10* (2013.01); *C22C 1/02* (2013.01); *C22C 19/05* (2013.01); *C22C 19/057* (2013.01); *F01D 5/28* (2013.01); *F01D 25/00* (2013.01); *F02C 7/00* (2013.01); *C22F 1/00* (2013.01); *F05D 2220/32* (2013.01); *F05D 2230/40* (2013.01); *F05D 2300/177* (2013.01)

(58) Field of Classification Search
CPC ........ C22C 19/057; C22C 19/056; C22F 1/10
See application file for complete search history.

(56) References Cited

U.S. PATENT DOCUMENTS

| | | | |
|---|---|---|---|
| 6,074,602 A | 6/2000 | Wukusick et al. | |
| 6,607,611 B1 | 8/2003 | Darolla | |
| 2009/0196760 A1 | 8/2009 | Harada | |
| 2009/0214379 A1 | 8/2009 | Yoshinari et al. | |
| 2011/0076180 A1 | 3/2011 | Suzuki | |
| 2011/0076182 A1 | 3/2011 | Suzuki et al. | |

FOREIGN PATENT DOCUMENTS

| | | |
|---|---|---|
| CN | 101089214 | 12/2007 |
| CN | 101089215 | 12/2007 |
| CN | 102031418 | 4/2011 |
| CN | 102031420 | 4/2011 |
| CN | 102653832 | 9/2012 |
| CN | 103966671 | 8/2014 |
| EP | 1 795 621 | 6/2007 |
| JP | 9-170402 | 6/1997 |
| JP | 2007-162041 | 6/2007 |
| JP | 2010-132966 | 6/2010 |

OTHER PUBLICATIONS

International Search Report dated Oct. 11, 2016 in International (PCT) Application No. PCT/JP2016/069868, with English translation.
Written Opinion of the International Searching Authority dated Oct. 11, 2016 in International (PCT) Application No. PCT/JP2016/069868, with English translation.

*Primary Examiner* — Jessee R Roe
(74) *Attorney, Agent, or Firm* — Wenderoth, Lind & Ponack, L.L.P.

(57) ABSTRACT

Provided is a high-strength, heat-resistant, Ni-base alloy comprising Co: from 5 to 12%, Cr: from 5 to 12%, Mo: from 0.5 to 3.0%, W: from 3.0 to 6.0%, Al: from 5.5 to 7.2%, Ti: from 1.0 to 3.0%, Ta: from 1.5 to 6.0%, Re: from 0 to 2.0%, and C: from 0.01 to 0.20%. The high-strength, heat-resistant, Ni-base alloy is constituted of a Ni-based alloy, the balance of the Ni-based alloy comprising Ni and inevitable impurities. The density of the high-strength, heat-resistant Ni-base alloy is less than 8.5 g/cm$^3$.

2 Claims, 1 Drawing Sheet

HIGH-STRENGTH, HEAT-RESISTANT NI-BASE ALLOY, METHOD FOR PRODUCING SAME, AND GAS TURBINE BLADE

TECHNICAL FIELD

The present invention relates to a high-strength, heat-resistant Ni-base alloy used in applications that require high-temperature strength such as large gas turbine blades; a method for producing the high-strength, heat-resistant Ni-base alloy; and a gas turbine blade made from the high-strength, heat-resistant Ni-base alloy.

This application claims priority based on Japanese Patent Application No. 2015-137586 filed in Japan on Jul. 9, 2015, of which the contents are incorporated herein by reference.

BACKGROUND ART

As is known, gas turbines are configured such that fuel is sprayed into compressor discharge air and is combusted to produce high-temperature, high-pressure gas for driving the turbine. A gas turbine rotates a shaft by rotating gas turbine blades by high-temperature, high-pressure gas, thereby obtaining motive power. In such a gas turbine, the blades (gas turbine blades) are under high temperature and high pressure. Thus, cast materials having a single-crystal structure or a directionally solidified columnar structure made from a heat-resistant Ni-base alloy having high strength at high temperature have been conventionally used as materials for gas turbine blades.

In the current state of the art, 1600° C.-grade gas turbines are operated as the most efficient gas turbines. However, from the perspective of environmental safety, development of the next generation of high-efficiency gas turbines which are even more efficient is underway in various countries around the world. Accordingly, even higher strength of hot parts, typified by gas turbine blades, has come to be demanded to contribute to improved efficiency and reliability.

Incidentally, industrial gas turbine blades are large and incur stress due to high centrifugal force. In particular, rear stage turbine blades incur remarkably high stress due to centrifugal force because they are extremely large. For this reason, a turbine material with sufficiently high high-temperature strength, especially high-temperature creep strength, is desired. Large rear stage turbine blades also have a large dead weight. Thus, to improve efficiency of an engine, it is desirable that density be small while strength is maintained, that is, that specific strength, obtained by dividing strength by density, be high.

Here, single-crystal alloys have strength superior to those of directionally solidified alloys but are sensitive to casting defects. For this reason, single-crystal alloys are difficult to use in production of large turbine blades. Thus, it is common to use a directionally solidified alloy, which is relatively easy to produce, for large turbine blades. Thus, increased strength of directionally solidified alloys has been required such that the directionally solidified alloys is suitable for large turbine blades. However, achieving both low density and high strength (particularly high-temperature creep strength) in a compatible manner is a high technical hurdle.

Incidentally, heat-resistant Ni-base alloys are representative alloys of so-called superalloys. In a heat-resistant Ni-base alloy, a γ' phase such as $Ni_3Al$ or $Ni_3(Al, Ti)$ precipitates out in the γ phase serving as a matrix, and high strength is obtained through a precipitation hardening effect thereof. In a heat-resistant Ni-base alloy, depending on trace additive elements, a γ" phase such as $Ni_3Nb$ may also precipitate out and contribute to precipitation hardening. The γ phase serving as the matrix is also typically strengthened by forming a solid solution of alloying elements (solid solution strengthening). Thus, high strength can be attained by comprehensively making effective use of strengthening mechanisms such as precipitation hardening and solid solution strengthening.

The alloy described in Patent Document 1 is an example of such an alloy strengthened at high temperature as a heat-resistant Ni-base alloy used in gas turbine blades.

CITATION LIST

Patent Document

Patent Document 1: JP 2007-162041 A

SUMMARY OF INVENTION

Technical Problems

As described above, there is a strong demand for further improvement of strength, especially high-temperature creep strength, beyond the conventional in large gas turbine blades made from directionally solidified alloy. It is also strongly desired that density be low while high strength is simultaneously assured, that is, that specific strength be high. However, in conventional heat-resistant Ni-base alloys as described in, for example, Patent Document 1, strength, especially high-temperature creep strength, is still not sufficient for directionally solidified alloys. The situation is that density has not been sufficiently reduced, either.

With the above circumstances as a background, an object of the present invention is to provide a high-strength, heat-resistant Ni-base alloy that has sufficiently high strength, especially high-temperature creep strength, while simultaneously having reduced density. At the same time, an object of the present invention is to provide a method for actually producing such a high-strength, heat-resistant Ni-base alloy, and provide a gas turbine blade using the alloy.

Solution to Problems

As a result of detailed experiments and research on the influence of the component elements of a heat-resistant Ni-base alloy on density and high-temperature strength, especially high-temperature creep strength, the present inventors discovered optimal ranges of alloy composition to solve the above problems, and thereby achieved the present invention.

Specifically, a high-strength, heat-resistant Ni-base alloy of a basic aspect (first aspect) of the present invention is constituted of a Ni-base alloy comprising, by mass %:

Co: from 5 to 12%,
Cr: from 5 to 12%,
Mo: from 0.5 to 3.0%,
W: from 3.0 to 6.0%,
Al: from 5.5 to 7.2%,
Ti: from 1.0 to 3.0%,
Ta: from 1.5 to 6.0%,
Re: from 0 to 2.0%, and
C: from 0.01 to 0.20%,
the balance of the Ni-base alloy comprising Ni and inevitable impurities, and the density of the high-strength, heat-resistant Ni-base alloy being less than 8.5 g/cm³.

In such a high-strength, heat-resistant Ni-base alloy, the components of the Ni-base alloy are adjusted to within the ranges of alloy composition described above. As a result, high-temperature strength, especially high-temperature creep strength, is high, and moreover, high high-temperature creep strength is obtained even with low density (that is, specific strength is high). Furthermore, the high-strength, heat-resistant Ni-base alloy can be made into an alloy also having excellent characteristics demanded in gas turbine blades and the like, such as oxidation resistance.

A high-strength, heat-resistant Ni-base alloy of a second aspect of the present invention is the high-strength, heat-resistant Ni-base alloy of the first aspect, wherein the Ni-base alloy may further comprise one or more among B: from 0.005 to 0.030%, Hf: from 0.01 to 0.15%, and Zr: from 0.001 to 0.02%.

A high-strength, heat-resistant Ni-base alloy of a third aspect of the present invention is the high-strength, heat-resistant Ni-base alloy of the first or second aspect, wherein the Mo content in the Ni-base alloy may be in the range of from 1.0 to 2.5%.

A high-strength, heat-resistant Ni-base alloy of a fourth aspect of the present invention is the high-strength, heat-resistant Ni-base alloy of the first or second aspect, wherein the Al content in the Ni-base alloy may be in the range of from 5.8 to 6.4%.

A high-strength, heat-resistant Ni-base alloy of a fifth aspect of the present invention is the high-strength, heat-resistant Ni-base alloy of the first or second aspect, wherein the Ti content in the Ni-base alloy may be in the range of from 1.5 to 3.0%.

A high-strength, heat-resistant Ni-base alloy of a sixth aspect of the present invention is the high-strength, heat-resistant Ni-base alloy of any one of the first to fifth aspects, wherein a parameter P1 defined by Equation (1) by the content (mass %) of each component is taken to be a second-phase shape parameter P1, and the content of each component of the Ni-base alloy may be set such that the second-phase shape parameter P1 is in the range of from −0.4 to −0.24, $$P1=1.2-0.0036\times[\% \text{ Co}]-0.023\times[\% \text{ Cr}]-0.072\times[\% \text{ Mo}]-0.029\times[\% \text{ W}]-0.12\times[\% \text{ Al}]-0.072\times[\% \text{ Ti}]-0.014\times[\% \text{ Ta}]-0.06\times[\% \text{ Re}]-0.13\times[\% \text{ C}] \quad (1).$$

In this sixth aspect, each component content is adjusted such that the second-phase shape parameter P1 is within the range of from −0.4 to −0.24. By so doing, reliable, stable, and high high-temperature creep strength can be assured.

A high-strength, heat-resistant Ni-base alloy of a seventh aspect of the present invention is the high-strength, heat-resistant Ni-base alloy of the sixth aspect, wherein the content of each component of the Ni-base alloy may be set such that the second-phase shape parameter P1 is in the range of from −0.35 to −0.26

A high-strength, heat-resistant Ni-base alloy of an eighth aspect of the present invention is the high-strength, heat-resistant Ni-base alloy of any one of the first to seventh aspects, wherein a parameter P2 defined by Equation (2) by the content (mass %) of each component is taken to be a phase stability parameter P2, and the content of each component of the Ni-base alloy may be set such that the phase stability parameter P2 is in the range of from −1.0 to 0, $$P2=0.06\times[\% \text{ Co}]+0.44\times[\% \text{ Cr}]+0.6\times[\% \text{ Mo}]+0.48\times[\% \text{ W}]+2.2\times[\% \text{ Al}]+1.8\times[\% \text{ Ti}]+0.65\times[\% \text{ Ta}]+0.35\times[\% \text{ Re}]-4.6\times[\% \text{ C}]-26.4 \quad (2).$$

In the high-strength, heat-resistant Ni-base alloy of this eighth aspect, each component content is adjusted such that the phase stability parameter P2 is not greater than 0 (zero). By so doing, precipitation of a harmful phase (the TCP phase to be described later), which causes embrittlement of the material, can be prevented even when used at high temperature for a long period. At the same time, high high-temperature creep strength can be assured.

A high-strength, heat-resistant Ni-base alloy of a ninth aspect of the present invention is the high-strength, heat-resistant Ni-base alloy of the eighth aspect, wherein the content of each component of the Ni-base alloy may be set such that the phase stability parameter P2 is in the range of from −0.7 to 0.

A high-strength, heat-resistant Ni-base alloy of a tenth aspect of the present invention is the high-strength, heat-resistant Ni-base alloy of any one of the first to ninth aspects, wherein the high-strength, heat-resistant Ni-base alloy may be a directionally solidified alloy.

With a general conventional Ni-base alloy, strength is typically worse in a directionally solidified alloy than in a single-crystal material. However, with a Ni-base alloy within the ranges of alloy composition of the present invention, strength of a directionally solidified alloy is not inferior to those of a single-crystal material.

A method for producing a high-strength, heat-resistant Ni-base alloy of an eleventh aspect of the present invention uses the Ni-base alloy according to any one of the first to ninth aspects. The method comprises, as solution heat treatment, heating a directionally solidified alloy of the Ni-alloy to a temperature in the range of from 1180 to 1320° C. and cooling, and then, as stabilization heat treatment, heating the cast material to a temperature in the range of from 1050 to 1150° C. and cooling, and then, as aging heat treatment, heating the cast material to a temperature in the range of from 800 to 900° C. for not less than 4 hours.

A method for producing a high-strength, heat-resistant Ni-base alloy of a twelfth aspect of the present invention is the production method of the eleventh aspect, wherein a gas turbine blade is produced as the high-strength, heat-resistant Ni-base alloy.

A gas turbine blade of a thirteenth aspect of the present invention is made from the high-strength, heat-resistant Ni-base alloy of any one of the first to tenth aspects.

Advantageous Effects of Invention

The high-strength, heat-resistant Ni-base alloy of the present invention has high high-temperature strength, especially high-temperature creep strength. Moreover, in the above high-strength, heat-resistant Ni-base alloy, high high-temperature creep strength is obtained even with low density (that is, specific strength is high). The above high-strength, heat-resistant Ni-base alloy also has excellent characteristics such as oxidation resistance.

DESCRIPTION OF EMBODIMENTS

The high-strength, heat-resistant Ni-base alloy, method for producing the same, and turbine blade of the present invention will be described in detail below.

Alloy Composition

The high-strength, heat-resistant, Ni-base alloy of the present invention basically comprises, as the alloy composition, by mass %: Co (cobalt): from 5 to 12%, Cr (chromium): from 5 to 12%, Mo (molybdenum): from 0.5 to 3.0%, W (tungsten): from 3.0 to 6.0%, Al (aluminum): from 5.5 to 7.2%, Ti (titanium): from 1.0 to 3.0%, Ta (tantalum): from 1.5 to 6.0%, Re (rhenium): from 0 to 2.0%, and C (carbon): from 0.01 to 0.20%. The balance of the high-strength, heat-resistant Ni-base alloy comprises Ni (nickel) and inevitable impurities.

Furthermore, the high-strength, heat-resistant Ni-base alloy of the present invention may contain, in addition to each component described above, as necessary, one or more among B (boron): from 0.005 to 0.030%, Hf (hafnium): from 0.01 to 0.15%, and Zr (zirconium): from 0.001 to 0.02%.

The reasons for restricting the alloy composition in this manner are as follows.

Co: from 5 to 12%

Co has a solution promoting effect, which increases the limit (solid solution limit) at which Ti, Al, and the like form a solid solution with a matrix at high temperature. For this reason, heat treatment brings about an effect of improving strength of the Ni-base alloy due to dispersed fine precipitation of the γ' phase (compounds of Ni and Ti, Al, Ta, and the like). However, if the Co content is too great, it ends up promoting precipitation of a harmful phase to be described later. Thus, the Co content is determined by balancing these factors. That is, if the Co content is greater than 12%, a harmful phase precipitates out when used at high temperature for a long period, which causes embrittlement. On the other hand, if the Co content is less than 5%, it is difficult to sufficiently bring out the solution promoting effect of adding Co. Thus, the Co content is set to the range of from 5 to 12%. Furthermore, within the above range, the Co content is particularly preferably in the range of from 5 to 10%.

Cr: from 5 to 12%

Cr is an element effective in improving oxidation resistance at high temperature. The higher the Cr content in the alloy, the more prominent its effect is. When the Cr content is less than 5%, the improvement of high-temperature oxidation resistance by adding Cr is insufficient. On the other hand, if the Cr content is greater than 12%, it is not preferred because it causes precipitation of a harmful phase and induces decreases in strength and ductility. Thus, the Cr content is set to the range of from 5 to 12%. Furthermore, within the above range, the Cr content is particularly preferably in the range of from 5 to 10% to more reliably suppress precipitation of a harmful phase.

Mo: from 0.5 to 3.0%

Mo forms a solid solution with the γ phase matrix, and has the effect of improving strength through solid solution strengthening. However, if the Mo content is high, the specific gravity of the alloy may become high, and specific strength may decrease. Additionally, if the Mo content is high, a harmful phase precipitates out, causing decreases in strength and ductility. That tendency is higher particularly when the Mo content is greater than 3.0%. On the other hand, when the Mo content is less than 0.5%, the strength improvement effect through solid solution strengthening is not sufficiently obtained. Thus, the Mo content is set to the range of from 0.5 to 3.0%. Furthermore, within the above range, the Mo content is particularly preferably in the range of from 1.0 to 2.5%.

W: from 3.0 to 6.0%

Like Mo, W forms a solid solution with the γ phase matrix, and has the effect of improving strength through solid solution strengthening. However, if the W content is high, the specific gravity of the alloy may become high, and specific strength may decrease. Additionally, if the W content is high, a harmful phase precipitates out, causing decreases in strength and ductility. That tendency is higher particularly when the W content is greater than 6.0%. On the other hand, when the W content is less than 3.0%, the strength improvement effect through solid solution strengthening is not sufficiently obtained. Thus, the W content is set to the range of from 3.0 to 6.0%. Furthermore, within the above range, the W content is particularly preferably in the range of from 3.0 to 5.0%.

Al: from 5.5 to 7.2%

Al is an element that generates the γ' phase. Through precipitation hardening by γ' phase precipitate particles, Al has the effects of increasing high-temperature strength, especially high-temperature creep strength of the alloy, and improving corrosion resistance and oxidation resistance of the alloy at high temperature. Additionally, since Al is a lightweight element, an increase in the Al content provides an effect of increasing specific strength. When the Al content is greater than 7.2%, a harmful phase may precipitate out, causing decreases in strength and ductility. On the other hand, when the Al content is less than 5.5%, the precipitated amount of γ' phase may decrease and precipitation hardening by the precipitate particles may be insufficient. Thus, the Al content is set to the range of from 5.5 to 7.2%. Furthermore, within the above range, the Al content is particularly preferably in the range of from 5.8 to 6.4%.

Ti: from 1.0 to 3.0%

Like Al, Ti is an element that generates the γ' phase. Through precipitation hardening by γ' phase precipitate particles, Ti has the effects of increasing high-temperature strength, especially high-temperature creep strength of the alloy, and improving corrosion resistance and oxidation resistance of the alloy at high temperature. Additionally, since Ti is a lightweight element, an increase in the Ti content provides an effect of increasing specific strength. When the Ti content is greater than 3.0%, a harmful phase may precipitate out, causing decreases in strength and ductility. On the other hand, when the Ti content is less than 1.0%, the precipitated amount of γ' phase may decrease and precipitation hardening by the precipitate particles may be insufficient. Thus, the Ti content is set to the range of from 1.0 to 3.0%. Furthermore, within the above range, the Ti content is particularly preferably in the range of from 1.5 to 3.0%.

Ta: from 1.5 to 6.0%

Like Al and Ti, Ta is an element that generates the γ' phase. Through precipitation hardening by γ' phase precipitate particles, Ta has the effects of increasing high-temperature strength, especially high-temperature creep strength of the alloy, and improving corrosion resistance and oxidation resistance of the alloy at high temperature. However, when the Ta content is greater than 6.0%, a harmful phase may precipitate out, causing decreases in strength and ductility. On the other hand, when the Ta content is less than 1.5%, the precipitated amount of γ' phase may decrease and precipitation hardening by the precipitate particles may be insufficient. Thus, the Ta content is set to the range of from 1.5 to 6.0%. Furthermore, within the above range, the Ta content is particularly preferably in the range of from 2.0 to 5.0%.

Hf: from 0.01 to 0.15%

Hf improves oxidation resistance and strengthens grain boundaries, and has the effects of improving strength and ductility. Thus, Hf is added as necessary. However, if the Hf content is greater than 0.15%, the localized melting point of grain boundary portions may decrease, causing a decrease in strength. On the other hand, if the Hf content is less than 0.01%, the effect of grain boundary strengthening is not sufficiently obtained. Thus, the Hf content is set to the range of from 0.01 to 0.15% in cases where Hf is added. Furthermore, within the above range, the Hf content is particularly preferably in the range of from 0.01 to 0.10%. The lower limit of Hf content of 0.01% indicates the lower limit in cases where Hf is proactively added as necessary, and of course an Hf content of less than 0.01% as an impurity is permitted.

Re: from 0 to 2.0%

Re has the effect of improving corrosion resistance. Like Mo, Re forms a solid solution with the γ phase matrix, and has the effect of improving strength through solid solution strengthening. However, Re is an expensive element. On the other hand, since Mo or W can be added for solid solution strengthening of the matrix, the content of Re is preferably held to a relatively small amount. From that perspective, the Re content is set to not greater than 2.0%. Furthermore, Re does not necessarily have to be added. Thus, the Re content is stipulated as the range of from 0 to 2.0%. Furthermore, within the above range, the Re content is particularly preferably in the range of from 0 to 1.5%.

C: from 0.01 to 0.20%

C has the effect of strengthening the grain boundaries of the matrix γ phase and improving high-temperature creep strength. When the C content is greater than 0.20%, generation of carbides may be too great and ductility may decrease. On the other hand, when the C content is less than 0.01%, the grain boundary strengthening effect of added C cannot be expected. Thus, the C content is set to the range of from 0.01 to 0.20%. Furthermore, within the above range, the C content is particularly preferably in the range of from 0.01 to 0.15%.

B: from 0.005 to 0.030%

Like C, B has the effect of strengthening the grain boundaries of the matrix γ phase and improving high-temperature creep strength. Thus, B is added as necessary. In cases where B is added, and the B content is greater than 0.030%, borides may be generated and ductility may decrease. On the other hand, when the B content is less than 0.005%, the grain boundary strengthening effect of added B cannot be expected. Thus, the B content is set to the range of from 0.005 to 0.030%. Furthermore, within the above range, the B content is particularly preferably in the range of from 0.010 to 0.020%. The lower limit of B content of 0.005% indicates the lower limit in cases where B is proactively added as necessary, and of course a B content of less than 0.005% as an impurity is permitted.

Zr: from 0.001 to 0.02%

Zr also has the effect of strengthening the grain boundaries of the matrix γ phase and improving high-temperature creep strength. Thus, Zr is added as necessary. However, in cases where Zr is added, and the Zr content is greater than 0.02%, the localized melting point of grain boundary portions may decrease, causing a decrease in strength. On the other hand, when the Zr content is less than 0.001%, the grain boundary strengthening effect of the added Zr cannot be expected. Thus, the Zr content is set to the range of from 0.001 to 0.02%. Furthermore, within the above range, the Zr content is particularly preferably in the range of from 0.005 to 0.02%. The lower limit of Zr content of 0.001% indicates the lower limit in cases where Zr is proactively added as necessary, and of course a Zr content of less than 0.001% as an impurity is permitted.

The balance of the above elements includes Ni and inevitable impurities. This type of Ni-base alloy may contain Fe (iron), Si (silicon), Mn (manganese), Cu (copper), P (phosphorus), S (sulfur), N (nitrogen) and the like as unavoidable impurities. The content of Fe, Si, Mn, and Cu is preferably not greater than 0.5% each, and the content of P, S, and N is preferably not greater than 0.01% each.

Density of Member

The high-strength, heat-resistant Ni-base alloy of the present invention is made from a Ni-base alloy having the composition described above, and the density of the high-strength, heat-resistant Ni-base alloy is set to less than 8.5 g/cm$^3$. That is, as described above, if density is high in a large gas turbine blade, the dead weight of the gas turbine blade is large, which causes a decrease in engine efficiency. However, a decrease in engine efficiency can be prevented even in a large gas turbine blade by reducing density to less than 8.5 g/cm$^3$.

Here, in a conventional general Ni-base alloy, there is a strong possibility that decreasing density will cause a decrease in strength, particularly a decrease in high-temperature creep strength. In the Ni-base alloy within the ranges of alloy composition stipulated in the present invention, the compositions have been appropriately adjusted. As a result, high high-temperature creep strength is obtained while low density is achieved.

That is, the present inventors investigated the relationship between 900° C. creep life and density of directionally solidified cast materials within the ranges of alloy composition of the present invention. As a result, the present inventors ascertained that in the Ni-base alloy of the present invention, lower density than that of conventional alloys is obtained while high high-temperature creep strength is assured.

Furthermore, the density of the high-strength, heat-resistant Ni-base alloy is preferably less than 8.4 g/cm$^3$.

Due to the added amounts of each alloying element being adjusted to within the above ranges of alloy composition, high-temperature strength, especially high-temperature creep strength, is high, and moreover, high high-temperature creep strength is obtained even with low density (that is, specific strength is high). Furthermore, the alloys of the present invention can be made into an alloy also having excellent characteristics demanded in gas turbine blades, such as oxidation resistance.

However, to assure more reliable and stable high high-temperature creep strength, the content of each component is preferably adjusted such that the parameter (second-phase shape parameter) P1 of Equation (1) below determined by the component contents of the alloy is within the range of from −0.4 to −0.24. The second-phase shape parameter P1 will be described below.

Second-phase Shape Parameter P1

In a Ni-base alloy, a γ' phase as a second phase is present as precipitate particles. The precipitation hardening effect of the second phase particles contributes to improving the strength, especially the high-temperature creep strength, of the Ni-base alloy. Furthermore, the present inventors found that the shape (whether the cross-sectional shape is close to circular or far from circular) of the second phase particles (γ' phase precipitate particles) greatly influences high-temperature creep strength. The content of each component is adjusted such that the second-phase shape parameter P1 of Equation (1) below, as an index related to the shape of the γ' phase precipitate particles, determined from the content of each of the alloying elements is within the range of from −0.4 to −0.24. The present inventors newly discovered that by so doing, reliable, stable, and high high-temperature creep strength can be assured, $$P1=1.2-0.0036\times[\% \text{ Co}]-0.023\times[\% \text{ Cr}]-0.072\times[\% \text{ Mo}]-0.029\times[\% \text{ W}]-0.12\times[\% \text{ Al}]-0.072\times[\% \text{ Ti}]-0.014\times[\% \text{ Ta}]-0.06\times[\% \text{ Re}]-0.13\times[\% \text{ C}] \quad (1).$$

Note that in Equation (1), all percentages are mass %.

Furthermore, within the above range of from −0.4 to −0.24, the second-phase shape parameter P1 is particularly preferably in the range of from −0.35 to −0.26.

The history and findings leading to the realization that the second-phase shape parameter P1 has an effect will be described in further detail below.

As described above, in a Ni-base alloy, a γ' phase as a second phase is present as precipitate particles. The precipitation hardening effect of the second phase particles contributes to improving the strength, especially the high-temperature creep strength, of the Ni-base alloy. Thus, in designing a Ni-base alloy, the added amounts of the added elements (primarily Al, and also Ti, Ta, and the like) are typically appropriately set that generate the γ' phase so as to cause precipitation of a suitable amount of γ' phase without hindering characteristics other than strength. However, it was found that not only the absolute quantity of the γ' phase-forming elements but also the shape of the γ' phase precipitate particles greatly affects strengthening by precipitation particles by the γ' phase.

That is, the γ' phase precipitate particles may have various shapes, from spherical (circular cross-sectional shape) to square, polygonal, flat, or an intermediate shape between these shapes. The difference between the lattice constant of the crystals of the matrix γ phase and the lattice constant of the crystals of the precipitate particle γ' phase greatly influences the γ' phase precipitate shape. That is, the smaller the difference between the lattice constant of the crystals of the γ phase and the lattice constant of the crystals of the precipitate particle γ' phase is, the closer the shape of the γ' phase precipitate particles is to a true sphere (and thus the cross-sectional shape is closer to a true circle). The larger the difference is, the farther away the shape of the γ' phase precipitate particles is from a true spherical shape, and becomes closer to a square or polygonal shape or a flat shape. The value obtained by subtracting the lattice constant of the γ phase from the lattice constant of the γ' phase and then dividing by the average of the two can be used as an index (second-phase shape index) expressing the shape of the γ' phase precipitate particles. Here, the shape of the γ' phase precipitate particles governs the condition of the contact interface between the matrix γ phase and the γ' phase precipitate particles (for example, whether it is smooth, whether it is angular, or whether there are recesses and projections on the interface). The condition of the contact interface influences the situation of crack generation and crack propagation during high-temperature creep in the Ni-base alloy, and consequently influences high-temperature creep strength.

Here, the matrix γ phase is the phase in which some of the alloying elements (some of W, Mo, Re, and the like, and also Cr, Co, and the like) form a solid solution with Ni. On the other hand, the γ' phase of precipitate particles is a composite phase consisting primarily of an $Ni_3Al$ phase and also combined with Ti and Ta. For this reason, the lattice constant of the crystals of the matrix γ phase and the lattice constant of the crystals of the precipitate particle γ' phase vary depending on the added amount of these elements. Furthermore, the influence on the lattice constants varies depending on the type of element. Thus, both the type and added amount of added elements influence the precipitate shape of the γ' phase. In other words, it was found that the second-phase shape index described above in regard to the above precipitate shape of the γ' phase also varies depending on the type and added amount of added elements, and this influences strength, especially high-temperature creep strength.

Thus, the present inventors examined in detail the relationship between high-temperature creep strength and the degree to which each of the added elements, within the ranges of alloy composition stipulated by the present invention, influences the lattice constant of the γ phase crystals and the lattice constant of the γ' phase crystals, and the degree to which each of the added elements influences the second-phase shape index related to the above γ' phase precipitate shape. As a result, the present inventors newly discovered that there is a certain correlation between the second-phase shape parameter P1 and high-temperature creep strength, when P1 stipulated by the above Equation (1) is taken to be the second-phase shape parameter.

Figure 1:
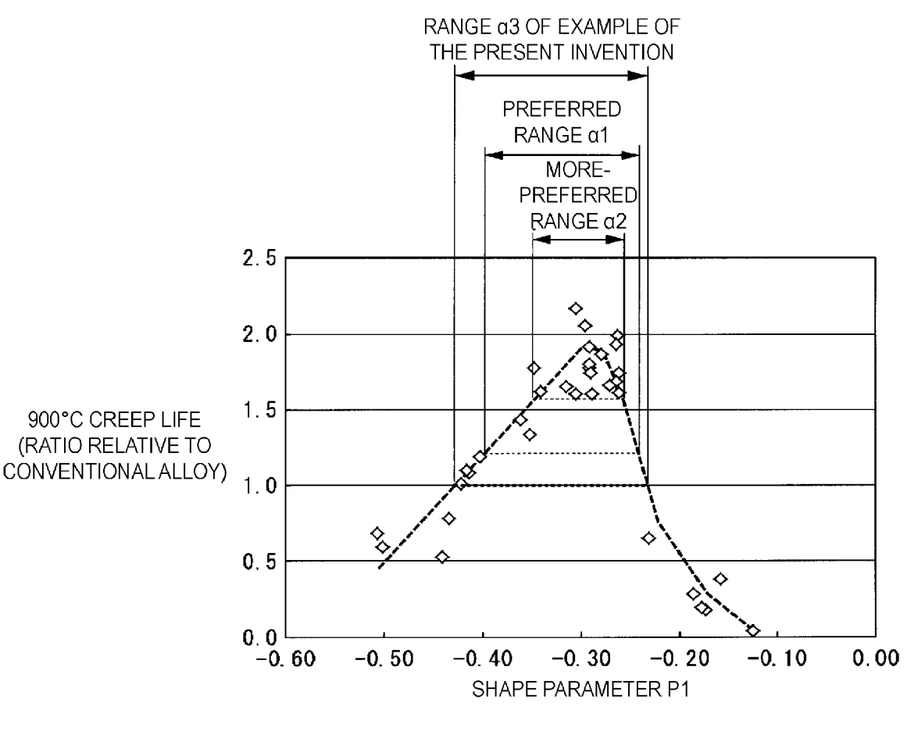
FIG. 1 is a graph illustrating the relationship between the second-phase shape parameter P1 and 900° C. creep strength in a Ni-base alloy.

Specifically, the present inventors varied the second-phase shape parameter P1 of a Ni-base alloy directionally solidified alloy and examined the relationship with 900° C. creep life as a general index of high-temperature creep strength. The results shown in FIG. 1 were obtained. In FIG. 1, the ratio relative to the 900° C. creep life of a conventional general heat-resistant Ni-base alloy (directionally solidified alloy) (normalized value) is shown on the vertical axis. Thus, in FIG. 1, when the vertical axis value is 1, it means that the 900° C. creep life is the same as that of the conventional alloy.

Here, the second-phase shape parameter P1 on the horizontal axis of FIG. 1 is 0 (zero) when the shape of the γ' phase precipitate particles is a true sphere. Equation (1) is set such that P1 becomes a larger negative value as the shape becomes more angular and farther from a true sphere.

As is understood from FIG. 1, it was demonstrated that when the second-phase shape parameter P1 changes from the negative side toward the positive side from around −0.5 to around −0.1, creep life becomes longer from around −0.5 to around −0.3. After that, the creep life peaks around −0.3, and then creep life becomes shorter beyond around −0.3. It was ascertained that when the second-phase shape parameter P1 is in the range α1 from −0.4 to −0.24, 900° C. creep life is not less than 1.2 times greater than that of the conventional Ni-base alloy, and therefore high-temperature creep strength is greatly improved over the conventional alloy. Thus, the second-phase shape parameter P1 is preferably in the range α1 from −0.4 to −0.24.

As is also clear from FIG. 1, when the second-phase shape parameter P1 is in the range α2 from −0.35 to −0.26, 900° C. creep life is greater than 1.6 times greater than that of the conventional alloy. Thus, it was ascertained that if the 900° C. creep life is greater than 1.6 times greater than that of the conventional alloy, the tolerable temperature increases approximately 30° C. over that of the conventional alloy. Thus, the more-preferred range α2 of the second-phase shape parameter P1 is from −0.35 to −0.26.

Furthermore, at the peak of the second-phase shape parameter P1 around −0.3, the 900° C. creep life is approximately from 2.0 to 2.2 times that of the conventional alloy.

Note that the contents of B, Hf, and Zr which are added as necessary are not included in Equation (1) which defines the second-phase shape parameter P1, but in cases where these elements are added, the added amounts are trace amounts and have a negligible influence on the shape of the γ' phase precipitate particles. Accordingly, the influence on 900° C. creep life is also negligible. Thus, the contents of B, Hf, and Zr are not included in Equation (1).

Phase Stability Parameter P2

In a Ni-base alloy, a phenomenon may occur wherein a certain phase that is not present before use at high temperature, called a topologically close packed (TCP) phase, precipitates out when used at high temperature for a long period. The TCP phase consists of long, narrow needle-shaped precipitates which cause embrittlement. Thus, if a TCP phase is present, the TCP phase can be called a harmful phase because the TCP phase reduces the high-temperature strength and the ductility of the Ni-base alloy. For this reason, it is desirable to suppress precipitation of a harmful layer (TCP phase) to the extent possible in a gas turbine blade used at high temperature for a long period. Thus, as an index for suppressing precipitation of such a harmful phase, the phase stability parameter P2 is set as an index corresponding to the alloy composition, as shown in Equation (2) below. The phase stability parameter P2 will be described in detail below.

The above harmful layer (TCP phase) is known to precipitate out when a large amount of strengthening elements such as Re and W is added. Thus, the present inventors formularized the added amount of each element of a Ni-base alloy and the ease of precipitation of a harmful layer by multiple regression analysis based on data obtained from numerous experimental results. As a result, the present inventors discovered that the value of P2 (phase stability parameter) given by Equation (2) below correlates to the ease of precipitation of a harmful layer.

$$P2=0.06\times[\% \text{ Co}]+0.44\times[\% \text{ Cr}]+0.6\times[\% \text{ Mo}]+0.48\times[\% \text{ W}]+2.2\times[\% \text{ Al}]+1.8\times[\% \text{ Ti}]+0.65\times[\% \text{ Ta}]+0.35\times[\% \text{ Re}]4.6\times[\% \text{ C}]-26.4 \quad (2).$$

Here, the larger the phase stability parameter P2 is above 0 (zero), the more easily a harmful phase precipitates out. Thus, to prevent precipitation of a harmful phase, it is desirable to adjust the components such that the phase stability parameter P2 is zero or negative. Thus, the upper limit value of the phase stability parameter P2 is set to 0.

However, as indicated by the following experimental results, it was ascertained that even with a composition in a range where a harmful phase does not precipitate out (P2≤0), the higher the phase stability parameter P2, that is, the closer the phase stability parameter P2 is to 0, the higher the high-temperature creep strength is.

Specifically, the present inventors varied the phase stability parameter P2 of Ni-base alloy cast materials formed by directional solidification and examined the relationships of the phase stability parameter P2 with 900° C. creep life and with the state of harmful phase precipitation. The results shown in Table 2 of the examples to be described later were obtained.

As can be understood from Table 2, 900° C. creep life is longer than that of the conventional alloy particularly when P2 is greater than around −1.0. However, when the phase stability parameter P2 is greater than 0, a harmful phase easily occurs, as described above. Thus, the composition of the Ni-base alloy is preferably adjusted such that the phase stability parameter P2 is in the range of from −1.0 to 0. Additionally, when the phase stability parameter P2 is greater than −0.7, 900° C. creep life is longer than that of the conventional alloy. For this reason, the composition of the Ni-base alloy is more preferably adjusted such that P2 is in the range of from −0.7 to 0.

Note that the contents of B, Hf, and Zr which are added as necessary are not included in Equation (2) which defines the phase stability parameter P2, but in cases where these elements are added, the added amounts are trace amounts and have a negligible influence on the generation of a harmful phase. Thus, the contents of B, Hf, and Zr are not included in Equation (2).

Furthermore, it is most desirable that both of the above second-phase shape parameter P1 and phase stability parameter P2 simultaneously satisfy the above preferred ranges (P1 from −0.4 to −0.24, P2 from −1.0 to 0), and further, that both of the above second-phase shape parameter P1 and phase stability parameter P2 simultaneously satisfy the more-preferred ranges (P1 from −0.35 to −0.26, P2 from −0.7 to 0). However, as long as within the ranges of alloy composition stipulated by the present invention, it is permitted for one of the parameters only to be outside the above preferred range or more-preferred range.

Production Method

Next, an example of the method for producing the high-strength, heat-resistant Ni-base alloy of the present invention will be described.

A melt of an alloy adjusted to the composition as described above is ingoted according to a conventional method, and then cast by directional solidification to form a cast material. The casting method by directional solidification may be selected as appropriate according to the shape and size of the member without particular limitation. After the obtained cast material is face-milled as appropriate, the cast material undergoes solution heat treatment (heating-cooling), and further undergoes stabilization heat treatment, followed by aging treatment.

In solution heat treatment, the cast material is heated to a temperature in the range of from 1180 to 1320° C., and then cooled. If the solution heat treatment temperature is lower than 1180° C., a sufficient solutioning effect is not obtained. On the other hand, if the solution heat treatment temperature is higher than 1320° C., areas where the localized melting point is low, such as grain boundaries, may melt and voids may be produced. Furthermore, the heating temperature of solution treatment is particularly preferably in the range of from 1230 to 1300° C. The hold time at the heating temperature in solution treatment is not particularly limited to a specific hold time but is typically not less than 2 hours. The cooling rate after heating is preferably approximately from 50 to 250° C./minute. Cooling is preferably performed to approximately not higher than 900° C.

Stabilization heat treatment is performed by heating the cast material to a temperature in the range of from 1050 to 1150° C. This stabilization treatment is performed in order to adjust the shape of the γ' phase and maximize the precipitation hardening effect. However, if the stabilization heat treatment temperature is lower than 1050° C., a sufficient stabilization effect is not obtained. On the other hand, if the stabilization heat treatment temperature is higher than 1150° C., the γ' phase may coarsen and the precipitation hardening effect may decrease. The hold time at the stabilization heat treatment temperature is not particularly limited to a specific temperature, but approximately from 2 to 5 hours is typically preferred.

Furthermore, the aging heat treatment conditions are heating for not less than 4 hours at a temperature in the range of from 800 to 900° C. If the heating temperature is lower than 800° C. or the heating hold time is less than 4 hours, strength improvement through aging precipitation cannot be expected. On the other hand, if the heating temperature is higher than 900° C., the γ' phase may coarsen and the precipitation hardening effect may decrease. The upper limit of heating hold time is not particularly set, but even if the heating hold time is greater than 30 hours, a further increase in precipitation hardening by aging is not expected, and it only hinders productivity.

Application to Turbine Blades

The high-strength, heat-resistant Ni-base alloy of the present invention may be advantageously used basically in applications that demand high high-temperature strength, especially high-temperature creep strength, and high specific strength. The high-strength, heat-resistant Ni-base alloy can exhibit excellent performance when used in large gas turbine blades as a directionally solidified alloy. The high-strength, heat-resistant Ni-base alloy can be produced according to the production method described above even when used in large gas turbine blades.

EXAMPLES

Examples of the present invention will be described below together with comparative examples.

Alloys of the compositions shown in A1 to A34 of Table 1 were ingoted according to a conventional method, and cylindrical cast materials measuring approximately 40 mm in diameter and approximately 300 mm in length were obtained by directional solidification. After face-milling the surface of the cast material, the cast material underwent solution treatment at from 1280 to 1320° C. for 5 hours, and was then cooled to 500° C. at a cooling rate of approximately 200° C./minute. Then, as stabilization treatment, the cast material was heated at 1100° C. for 4 hours. Additionally, aging treatment was performed at 870° C. for 20 hours.

The obtained member underwent 900° C. creep testing in accordance with the high-temperature creep test of JIS Z 2272.

The 900° C. creep life ratio until fracture (ratio relative to the 900° C. creep life of the conventional alloy), the second-phase shape parameter P1, the phase stability parameter P2, density, and the presence or absence of a harmful layer precipitation obtained by the above 900° C. creep test of the alloys of A1 to A34 are shown in Table 2.

TABLE 1

| Code | Component (mass %): balance Ni and unavoidable impurities | | | | | | | | | | | | |
|---|---|---|---|---|---|---|---|---|---|---|---|---|---|
| | Co | Cr | Mo | W | Al | Ti | Ta | Re | C | Hf | B | Zr | Remark |
| A1 | 8.1 | 8.1 | 0.5 | 4.0 | 6.2 | 2.1 | 1.0 | 1.4 | 0.10 | 0.1 | 0.015 | 0.009 | Comparative |
| A2 | 8.2 | 8.2 | 0.5 | 4.1 | 5.7 | 2.1 | 1.0 | 1.5 | 0.10 | 0.1 | 0.015 | 0.016 | Example |
| A3 | 8.2 | 8.2 | 0.5 | 4.0 | 5.7 | 3.0 | 1.0 | 1.5 | 0.09 | 0.1 | 0.015 | 0.016 | |
| A4 | 8.0 | 8.0 | 0.5 | 4.0 | 5.0 | 4.1 | 1.0 | 1.5 | 0.10 | 0.1 | 0.015 | 0.011 | |
| A5 | 8.0 | 8.0 | 0.4 | 4.0 | 6.1 | 3.1 | 1.0 | 1.5 | 0.11 | 0.1 | 0.014 | 0.015 | |
| A6 | 8.1 | 8.0 | 0.5 | 4.1 | 5.0 | 3.0 | 5.1 | 1.5 | 0.10 | 0.1 | 0.014 | 0.014 | |
| A7 | 8.1 | 7.8 | 4.5 | 4.0 | 7.1 | 1.0 | 2.0 | 1.6 | 0.08 | 0.1 | 0.015 | 0.015 | |
| A8 | 8.1 | 7.9 | 4.4 | 4.1 | 7.4 | 0.5 | 2.0 | 1.5 | 0.10 | 0.1 | 0.014 | 0.016 | |
| A9 | 8.1 | 8.1 | 5.0 | 2.0 | 6.2 | 3.0 | 2.1 | 0.0 | 0.09 | 0.1 | 0.015 | 0.014 | |
| A10 | 8.2 | 8.1 | 4.6 | 3.0 | 7.2 | 1.0 | 2.0 | 0.5 | 0.10 | 0.1 | 0.000 | 0.014 | |
| A11 | 8.0 | 8.1 | 2.0 | 4.0 | 7.2 | 2.0 | 2.0 | 1.5 | 0.10 | 0.1 | 0.014 | 0.015 | Example of |
| A12 | 8.2 | 7.9 | 3.0 | 4.0 | 7.2 | 1.0 | 2.0 | 1.6 | 0.10 | 0.1 | 0.014 | 0.015 | the present |
| A13 | 8.0 | 8.0 | 3.0 | 4.0 | 7.1 | 1.0 | 2.0 | 1.6 | 0.08 | 0.1 | 0.014 | 0.018 | invention |
| A14 | 8.0 | 8.1 | 2.0 | 4.0 | 7.2 | 2.1 | 2.0 | 1.5 | 0.10 | 0.0 | 0.000 | 0.000 | |
| A15 | 8.0 | 8.0 | 2.8 | 4.0 | 6.2 | 3.0 | 2.0 | 0.5 | 0.10 | 0.1 | 0.015 | 0.015 | |
| A16 | 8.1 | 8.0 | 2.0 | 4.1 | 6.7 | 2.0 | 2.0 | 1.5 | 0.08 | 0.1 | 0.014 | 0.013 | |
| A17 | 11.9 | 7.8 | 0.5 | 4.0 | 6.6 | 3.0 | 2.0 | 1.5 | 0.11 | 0.1 | 0.011 | 0.014 | |
| A18 | 8.0 | 8.1 | 1.8 | 4.0 | 6.3 | 2.8 | 1.9 | 1.5 | 0.10 | 0.1 | 0.013 | 0.017 | |
| A19 | 8.0 | 7.7 | 0.5 | 4.1 | 7.2 | 2.1 | 2.0 | 1.5 | 0.09 | 0.1 | 0.012 | 0.015 | |
| A20 | 8.1 | 8.0 | 2.0 | 4.0 | 6.3 | 2.5 | 2.0 | 1.5 | 0.10 | 0.1 | 0.014 | 0.011 | |
| A21 | 8.0 | 6.4 | 2.4 | 5.8 | 6.3 | 1.6 | 4.0 | 0.0 | 0.13 | 0.1 | 0.014 | 0.014 | |
| A22 | 8.0 | 6.5 | 2.0 | 4.0 | 6.3 | 2.5 | 2.0 | 1.5 | 0.10 | 0.1 | 0.015 | 0.012 | |
| A23 | 8.0 | 7.5 | 1.5 | 4.0 | 6.3 | 2.5 | 2.0 | 1.5 | 0.09 | 0.1 | 0.015 | 0.011 | |
| A24 | 10.0 | 7.6 | 1.4 | 3.5 | 6.4 | 2.5 | 2.0 | 1.4 | 0.12 | 0.1 | 0.015 | 0.011 | |
| A25 | 8.0 | 5.4 | 2.0 | 5.0 | 5.8 | 2.5 | 3.0 | 1.5 | 0.10 | 0.1 | 0.014 | 0.011 | |
| A26 | 8.0 | 6.5 | 2.0 | 4.0 | 6.3 | 2.0 | 3.5 | 1.5 | 0.11 | 0.1 | 0.014 | 0.013 | |
| A27 | 8.0 | 6.5 | 1.5 | 4.9 | 6.3 | 2.5 | 2.0 | 1.5 | 0.10 | 0.1 | 0.014 | 0.009 | |
| A28 | 8.0 | 7.5 | 1.5 | 4.0 | 6.3 | 2.0 | 3.5 | 1.5 | 0.11 | 0.1 | 0.014 | 0.011 | |
| A29 | 8.0 | 6.5 | 2.0 | 4.0 | 6.2 | 1.6 | 4.5 | 1.5 | 0.10 | 0.1 | 0.014 | 0.009 | |
| A30 | 8.0 | 6.5 | 1.8 | 4.0 | 6.3 | 1.8 | 3.5 | 1.5 | 0.10 | 0.1 | 0.014 | 0.011 | |
| A31 | 8.0 | 6.5 | 2.0 | 4.0 | 6.3 | 2.0 | 3.5 | 1.5 | 0.11 | 0.1 | 0.000 | 0.000 | |
| A32 | 8.0 | 7.5 | 1.5 | 4.0 | 6.3 | 1.8 | 3.6 | 1.5 | 0.10 | 0.1 | 0.000 | 0.000 | |
| A33 | 8.0 | 6.5 | 2.0 | 4.0 | 6.3 | 2.0 | 3.5 | 1.5 | 0.10 | 0.0 | 0.015 | 0.000 | |
| A34 | 8.0 | 7.5 | 1.5 | 3.8 | 6.3 | 2.0 | 3.5 | 1.5 | 0.09 | 0.0 | 0.000 | 0.011 | |

TABLE 2

| Code | Shape parameter P1 | Phase stability parameter P2 | Density (g/cm³) | 900° C. creep life ratio | Presence or absence of harmful phase | Remark |
|---|---|---|---|---|---|---|
| A1 | −0.17 | −2.03 | 8.2 | 0.18 | Absent | Comparative |
| A2 | −0.13 | −3.00 | 8.3 | 0.04 | Absent | example |
| A3 | −0.19 | −1.38 | 8.2 | 0.28 | Absent | |
| A4 | −0.18 | −1.09 | 8.3 | 0.19 | Absent | |

TABLE 2-continued

| Code | Shape parameter P1 | Phase stability parameter P2 | Density (g/cm³) | 900° C. creep life ratio | Presence or absence of harmful phase | Remark |
|---|---|---|---|---|---|---|
| A5 | −0.23 | −0.57 | 8.1 | 0.65 | Absent | |
| A6 | −0.16 | −0.35 | 8.4 | 0.38 | Absent | |
| A7 | −0.51 | 1.05 | 8.2 | 0.68 | Present | |
| A8 | −0.50 | 0.72 | 8.2 | 0.59 | Present | |
| A9 | −0.43 | 1.60 | 8.1 | 0.78 | Present | |
| A10 | −0.44 | 0.51 | 8.1 | 0.53 | Present | |
| A11 | −0.41 | 1.57 | 8.1 | 1.08 | Present | Example of the present invention |
| A12 | −0.42 | 0.33 | 8.2 | 1.10 | Present | |
| A13 | −0.40 | 0.23 | 8.2 | 1.19 | Present | |
| A14 | −0.42 | 1.75 | 8.1 | 1.01 | Present | |
| A15 | −0.36 | 1.26 | 8.2 | 1.43 | Present | |
| A16 | −0.35 | 0.57 | 8.2 | 1.34 | Present | |
| A17 | −0.31 | 1.21 | 8.1 | 1.66 | Present | |
| A18 | −0.35 | 0.84 | 8.2 | 1.78 | Present | |
| A19 | −0.31 | 0.77 | 8.1 | 1.61 | Present | |
| A20 | −0.34 | 0.45 | 8.2 | 1.62 | Present | |
| A21 | −0.26 | −0.14 | 8.1 | 1.74 | Absent | |
| A22 | −0.31 | −0.22 | 8.2 | 2.17 | Absent | |
| A23 | −0.29 | −0.03 | 8.2 | 1.78 | Absent | |
| A24 | −0.29 | −0.12 | 8.2 | 1.61 | Absent | |
| A25 | −0.26 | −0.67 | 8.3 | 1.99 | Absent | |
| A26 | −0.29 | −0.19 | 8.3 | 1.92 | Absent | |
| A27 | −0.30 | −0.08 | 8.3 | 2.06 | Absent | |
| A28 | −0.28 | −0.05 | 8.3 | 1.86 | Absent | |
| A29 | −0.26 | −0.43 | 8.3 | 1.94 | Absent | |
| A30 | −0.26 | −0.62 | 8.3 | 1.62 | Absent | |
| A31 | −0.29 | −0.19 | 8.3 | 1.80 | Absent | |
| A32 | −0.26 | −0.29 | 8.3 | 1.69 | Absent | |
| A33 | −0.29 | −0.14 | 8.3 | 1.74 | Absent | |
| A34 | −0.27 | −0.05 | 8.3 | 1.66 | Absent | |

Examples A1 to A10 are comparative examples in which some compositions are outside the ranges of the present invention. These examples have 900° C. creep life inferior to those of conventional alloys. Furthermore, in these examples A1 to A10, the second-phase shape parameter P1 is also outside the preferred range (from −0.4 to −0.24) of the present invention. Among the examples A1 to A10, generation of a harmful layer was seen in the examples in which the phase stability parameter P2 was greater than 0 (A7 to A10).

On the other hand, examples A11 to A34 are examples of the present invention in which all compositions are within the ranges of the present invention. The 900° C. creep life of these examples of the present invention is equal to or greater than that of the conventional alloy. In these examples of the present invention, the second-phase shape parameter P1 is within the range α3 of FIG. 1. Furthermore, among examples A11 to A34, the second-phase shape parameter P1 is also within the preferred range of the present invention (from −0.4 to −0.24) in examples A15 to A34. The 900° C. creep life ratio of examples A15 to A34 of the present invention is not less than 1.2 times greater than that of the conventional alloy. Furthermore, among examples A15 to A34, the second-phase shape parameter P1 is within the more-preferred range of the present invention (from −0.35 to −0.26) in examples A17 to A34. The 900° C. creep life ratio of examples A11 to A34 of the present invention is not less than 1.6 times greater than that of the conventional alloy. Furthermore, among examples A11 to A34, the phase stability parameter P2 is also within the preferred range of the present invention (from −1.0 to 0) in examples A21 to A34. In examples A21 to A34 of the present invention, no generation of a harmful layer was seen.

While preferred embodiments and examples of the present invention were described above, these embodiments and examples are no more than examples within the scope of the spirit of the present invention, and additions, omissions, substitutions, and other changes to the configuration may be made only within a scope that does not deviate from the spirit of the present invention. That is, the present invention is not to be considered limited by the foregoing description, and is limited only by the scope of the appended claims and may be modified as appropriate within that scope.

INDUSTRIAL APPLICABILITY

The above high-strength, heat-resistant Ni-base alloy has high high-temperature strength, especially high-temperature creep strength. Moreover, in the above high-strength, heat-resistant Ni-base alloy, high high-temperature creep strength is obtained even with low density (that is, specific strength is high). The above high-strength, heat-resistant Ni-base alloy also has excellent characteristics such as oxidation resistance and the like.

The invention claimed is:
1. A method for producing a heat-resistant Ni-base alloy, the method comprising;
   as solution heat treatment, heating a cast material obtained by directionally solidification of the Ni-alloy to a temperature in a range of from 1180 to 1320° C. with a holding time of not less than 2 hours and cooling the cast material to 900° C. or less at a cooling rate of 50 to 250° C./minute, and then;
   as stabilization heat treatment, heating the cast material to a temperature in a range of from 1050 to 1150° C. with a holding time of 2 to 5 hours and cooling; and then
   as aging heat treatment, heating the cast material to a temperature in a range of from 800 to 900° C. with a holding time of 4 to 30 hours,
   wherein the Ni-base alloy comprises, by mass %:

Co: from 8 to 10%,
Cr: from 5.4 to 7.5%,
Mo: from 1.4 to 2.4%,
W: from 3.5 to 5.8%,
Al: from 5.8 to 6.3%,
Ti: from 1.6 to 2.5%,
Ta: from 2.0 to 4.5%,
Re: from 0 to 1.5%, and
C: from 0.09 to 0.13%,
the balance of the Ni-base alloy comprising Ni and inevitable impurities, and
a density of the heat-resistant Ni-base alloy being less than 8.5 g/cm³,
wherein the Ni-base alloy do not comprise Si,
wherein a parameter P1 defined by Equation (1) by the content (mass %) of each component is taken to be a second-phase shape parameter P1, and a content of each component of the Ni-base alloy is set such that the second-phase shape parameter P1 is in a range of from −0.31 to −0.26, $$P1=1.2-0.0036\times[\% \text{ Co}]-0.023\times[\% \text{ Cr}]-0.072\times[\% \text{ Mo}]-0.029\times[\% \text{ W}]-0.12\times[\% \text{ Al}]-0.072\times[\% \text{ Ti}]-0.014\times[\% \text{ Ta}]-0.06\times[\% \text{ Re}]-0.13\times[\% \text{ C}] \quad (1),\text{ and}$$

wherein a parameter P2 defined by Equation (2) by the content (mass %) of each component is taken to be a phase stability parameter P2, and a content of each component of the Ni-base alloy is set such that the phase stability parameter P2 is in a range of from −0.7 to 0, $$P2=0.06\times[\% \text{ Co}]+0.44\times[\% \text{ Cr}]+0.6\times[\% \text{ Mo}]+0.48\times[\% \text{ W}]+2.2\times[\% \text{ Al}]+1.8\times[\% \text{ Ti}]+0.65\times[\% \text{ Ta}]+0.35\times[\% \text{ Re}]-4.6\times[\% \text{ C}]-26.4 \quad (2).$$

2. The method for producing a heat-resistant Ni-base alloy according to claim 1, wherein the heat-resistant Ni-base alloy is a gas turbine blade.

* * * * *